(12) United States Patent
Taskin et al.

(10) Patent No.: US 11,678,198 B2
(45) Date of Patent: Jun. 13, 2023

(54) METHOD, DEVICE, AND SYSTEM FOR SWITCHING FROM DFS MASTER MODE TO DFS SLAVE MODE

(71) Applicant: AIRTIES S.A.S., Paris (FR)

(72) Inventors: Metin Ismail Taskin, Istanbul (TR); Muharrem Sarper Gokturk, Istanbul (TR); Bilal Hatipoglu, Istanbul (TR); Can Ilhan, Istanbul (TR)

(73) Assignee: AIRTIES S.A.S., Paris (FR)

( * ) Notice: Subject to any disclaimer, the term of this patent is extended or adjusted under 35 U.S.C. 154(b) by 3 days.

(21) Appl. No.: 17/317,516

(22) Filed: May 11, 2021

(65) Prior Publication Data

US 2021/0266756 A1    Aug. 26, 2021

Related U.S. Application Data

(63) Continuation of application No. 16/483,567, filed as application No. PCT/IB2018/000172 on Feb. 5, 2018, now Pat. No. 11,006,279.

(Continued)

(51) Int. Cl.
*H04W 16/14*    (2009.01)
*H04W 24/08*    (2009.01)
(Continued)

(52) U.S. Cl.
CPC .......... *H04W 16/14* (2013.01); *H04W 24/08* (2013.01); *H04W 72/0453* (2013.01); *H04W 72/27* (2023.01); *H04W 72/541* (2023.01); *H04W 8/005* (2013.01); *H04W 84/12* (2013.01); *H04W 84/20* (2013.01); *H04W 92/20* (2013.01)

(58) Field of Classification Search
CPC . H04W 16/14; H04W 24/08; H04W 72/0426; H04W 72/0453; H04W 72/082; H04W 84/12; H04W 92/20; H04W 84/20; H04W 8/005; H04W 72/27; H04W 72/541
See application file for complete search history.

(56) References Cited

U.S. PATENT DOCUMENTS 9,439,197 B1    9/2016  Ngo et al.
9,565,684 B2    2/2017  Barkay et al.
(Continued)

OTHER PUBLICATIONS

European Telecommunications Standards Institute, "5GHz RLAN; Harmonised Standard covering the essential requirements of article 3.2 of Directive 2014/53/EU," ETSI EN 301 893 V2.1.1 (May 2017).

(Continued)

*Primary Examiner* — Omar J Ghowrwal
(74) *Attorney, Agent, or Firm* — Volpe Koenig

(57) ABSTRACT

A wireless device, for operation within a wireless network, the wireless device comprising: a RF transmitter, a RF receiver, and processing circuitry, where the RF transmitter sends a radar-detected message or a channel-switch announcement message to other wireless devices in the wireless networks. The other wireless devices receive the radar-detected message and abandon radar-detected channels designated in the radar-detected message. The other wireless devices also receive the channel-switch announcement message and switch to radar-free channels designated in the channel-switching message.

11 Claims, 15 Drawing Sheets

Related U.S. Application Data

(60) Provisional application No. 62/454,403, filed on Feb. 3, 2017.

(51) Int. Cl.
  H04W 72/0453 (2023.01)
  H04W 72/27 (2023.01)
  H04W 72/541 (2023.01)
  *H04W 8/00* (2009.01)
  *H04W 84/12* (2009.01)
  *H04W 84/20* (2009.01)
  *H04W 92/20* (2009.01)

(56) References Cited

U.S. PATENT DOCUMENTS

| | | | |
|---|---|---|---|
| 9,736,845 | B1 | 8/2017 | Yi et al. |
| 9,838,882 | B1 | 12/2017 | Yankevich et al. |
| 11,006,279 | B2 * | 5/2021 | Taskin ............... H04W 72/082 |
| 2005/0215266 | A1 | 9/2005 | Tsien et al. |
| 2008/0037469 | A1 * | 2/2008 | Hamilton ............. H04W 36/08 370/331 |
| 2009/0116411 | A1 | 5/2009 | Castagnoli et al. |
| 2009/0201851 | A1 | 8/2009 | Kruys et al. |
| 2013/0194944 | A1 | 8/2013 | Soyak et al. |
| 2016/0165617 | A1 | 6/2016 | Sakamoto et al. |
| 2017/0048864 | A1 | 2/2017 | Ngo et al. |
| 2017/0123049 | A1 * | 5/2017 | Tsai ...................... H04W 16/14 |
| 2017/0142728 | A1 | 5/2017 | Tsai et al. |
| 2017/0150368 | A1 | 5/2017 | Ngo et al. |
| 2018/0102961 | A1 | 4/2018 | Emmanuel et al. |
| 2018/0199342 | A1 | 7/2018 | Rai et al. |
| 2018/0213580 | A1 | 7/2018 | Taskin et al. |
| 2018/0255586 | A1 * | 9/2018 | Einhaus ................. H04J 13/00 |

OTHER PUBLICATIONS

European Telecommunications Standards Institute, "5GHz RLAN; Harmonised Standard covering the essential requirements of article 3.2 of Directive 2014/53/EU," Final draft ETSI EN 301 893 V2.1.0 (Mar. 2017).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

* cited by examiner

METHOD, DEVICE, AND SYSTEM FOR SWITCHING FROM DFS MASTER MODE TO DFS SLAVE MODE

CROSS REFERENCE TO RELATED APPLICATIONS

This application is a continuation application of U.S. patent application Ser. No. 16/483,567, filed on Aug. 5, 2019, which is the 371 application of international application no. PCT/IB2018/000172, which claims the benefit of U.S. provisional application No. 62/454,403, filed Feb. 3, 2017, which is incorporated by reference as if fully set forth. This application is also related to U.S. provisional patent application No. 62/448,718, filed Jan. 20, 2017, and U.S. patent publication no. 2013/0194944, filed Jul. 25, 2015, which are hereby incorporated by reference.

FIELD OF INVENTION

This disclosure relates to DFS (Dynamic Frequency Selection) and radar-avoidance management in wireless networks. In particular, but not exclusively, the disclosure relates to DFS and radar-avoidance management in multi-node networks.

BACKGROUND

Due to regulations, a node operating in radar frequencies is required to detect radar with at least a given probability, and in case of detection, it is required to change its operating frequency not to return to its previous frequency for a duration designated by the regulation. This is called dynamic frequency selection (DFS); the channels in which radar detection capability is required are called DFS channels, and the other available channels are called non-DFS channels. In general, the local authorities like ETSI in Europe and FCC in the USA govern the regulations for devices operating in certain frequency bands like 5 GHz. For example, according to ETSI, channels falling within 5150-5250 MHz are called non-DFS channels, whereas other channels falling within 5250-5350 MHz and 5490-5725 MHz are called DFS channels. Due to regulations, a node that detects radars has to cease transmission in the DFS channel during a predetermined time period, and then it may choose to switch to a radar-free channel. The node is allowed to make transmissions only in a fraction of the allowed predetermined time period. Soyak et al., U.S. Patent Publication No. 2013/0194944 discloses a method of detecting radar and avoiding the radar interference. The entire contents of Soyak et al. are incorporated herein by reference.

Master devices and slave devices with radar detection capability are nodes that are subject to DFS radar-detection regulations. Examples of the master devices are Access Points (APs) or Universal Repeaters (URs). Examples of the slave devices without radar-detection capability are wireless stations, i.e., wireless clients. Generally, slave nodes may not possess radar detection capability and they may be subject to the "slave without radar detection" rules of the DFS regulations. In some rare cases, however, slave nodes are capable of the radar detection capability.

Persons having ordinary skill in the art will understand that wireless devices like APs, URs, wireless stations, and wireless clients may comprise processing circuitry, a memory, communication circuitry including radio-frequency (RF) transmitters/receivers. For example, processing circuitry may include any suitable type of processing circuitry, such as one or more of a general-purpose processor (for example, an ARM-based processor), a chipset of a communications interface, an application-specific integrated circuit (ASIC), and a Field-Programmable Gate Array (FPGA). Memory may include any suitable type of volatile and non-volatile memory, such as random-access memory (RAM), read-only memory (ROM), flash memory, cloud storage, network accessible storage (NAS), or others. Communications circuitry may include any suitable type of communications circuitry to send or receive signals of certain protocols, such as WI-FI, Ethernet, Long-Term Evolution interface, BLUETOOTH Interface, Infrared (IR), Power Line Communication (PLC), Multiplexing over Coaxial (MoCA) or others. Persons having ordinary skill in the art will further understand that relevant RF transmitters/receivers are used to carry out such signals.

Being able to cease all transmissions in the operating frequency upon detection of radar is important as interfering with the radar may obfuscate critical radar operations. That is why WI-FI devices are tested for satisfying stringent DFS regulations.

Although DFS-aware operation is rather straightforward for a wireless network with a single-node, the DFS-aware operation in multi-node wireless networks (wireless networks with more than one radar-detection capable devices) is very complex. An example of single-node wireless networks is a WI-FI Basic Service Set (BSS), which comprises an AP with radar detection capability such as a master node, and one or more wireless stations without radar-detection capability such as slave devices. Examples of multi-node wireless networks is a wireless mesh network, a wireless network comprising an AP and at least one URs (or Repeaters), and a wireless network that comprises APs connected with each other through wired communications, such as Ethernet, MoCA (Multiplexing over Co-Axial), or PLC (Power Line Communication). A multi-node wireless network may make up an Extended Service Set (ESS) according to IEEE 802.11 standards.

A "node" in the multi-node wireless network may be a device that provides service to client devices (stations). For example, within this context, AP, UR, and wireless gateway (GW) are the nodes, whereas mobile clients may be stations. Or, the node may be a device that comprises the wireless network, and it may be utilized as a wireless access point.

The DFS-aware operation in multi-node wireless networks is complex, because each node in the network is spatially distributed, and hence it has a different view of the wireless medium. Because each node in the network is spatially distributed, one node detects radars while other nodes may not detect the same radars. In such cases, it is of paramount importance for the entire network to cease transmission in the radar-detected frequency.

DFS management in multi-node networks is disclosed herein. For example, the DFS management includes methods for operating a multi-node wireless network, as if it is a single-node network from the perspective of DFS regulations.

Further aspects of the disclosure will be apparent from the description and claims.

SUMMARY

Wireless communication devices operating within wireless mesh network or repeater network are adapted to detect radar; send or receive radar-detected and/or channel switch announcement (CSA) messages; to dynamically switch between master mode and slave mode; and to operate in different channels.

BRIEF DESCRIPTION OF THE DRAWINGS

The disclosure is described in reference to the drawings, in which.

DETAILED DESCRIPTION

According to one disclosure, a node employs two operational modes: master and slave. The Node can switch between these two operational modes during run-time, but it can be in one of these modes at a time. That is to say, both modes cannot be active at the same time. When a node is operating as "master," it has radar-detection capability, and it is subject to DFS regulations for master devices. When a node is operating as "slave," it is subject to DFS regulations for slave devices. According to the regulations, a slave device has to follow a master device for DFS-related operations. For example, if a master node detects radar, it immediately (within the duration allowed by the DFS regulations) informs slave devices (that are associated with the master node) about the channel change that is to happen, ceases its transmissions in the radar-detected frequency, and switches to an available, non-radar, channel. Slave devices must obey the messages coming from the master node.

Figure 1:
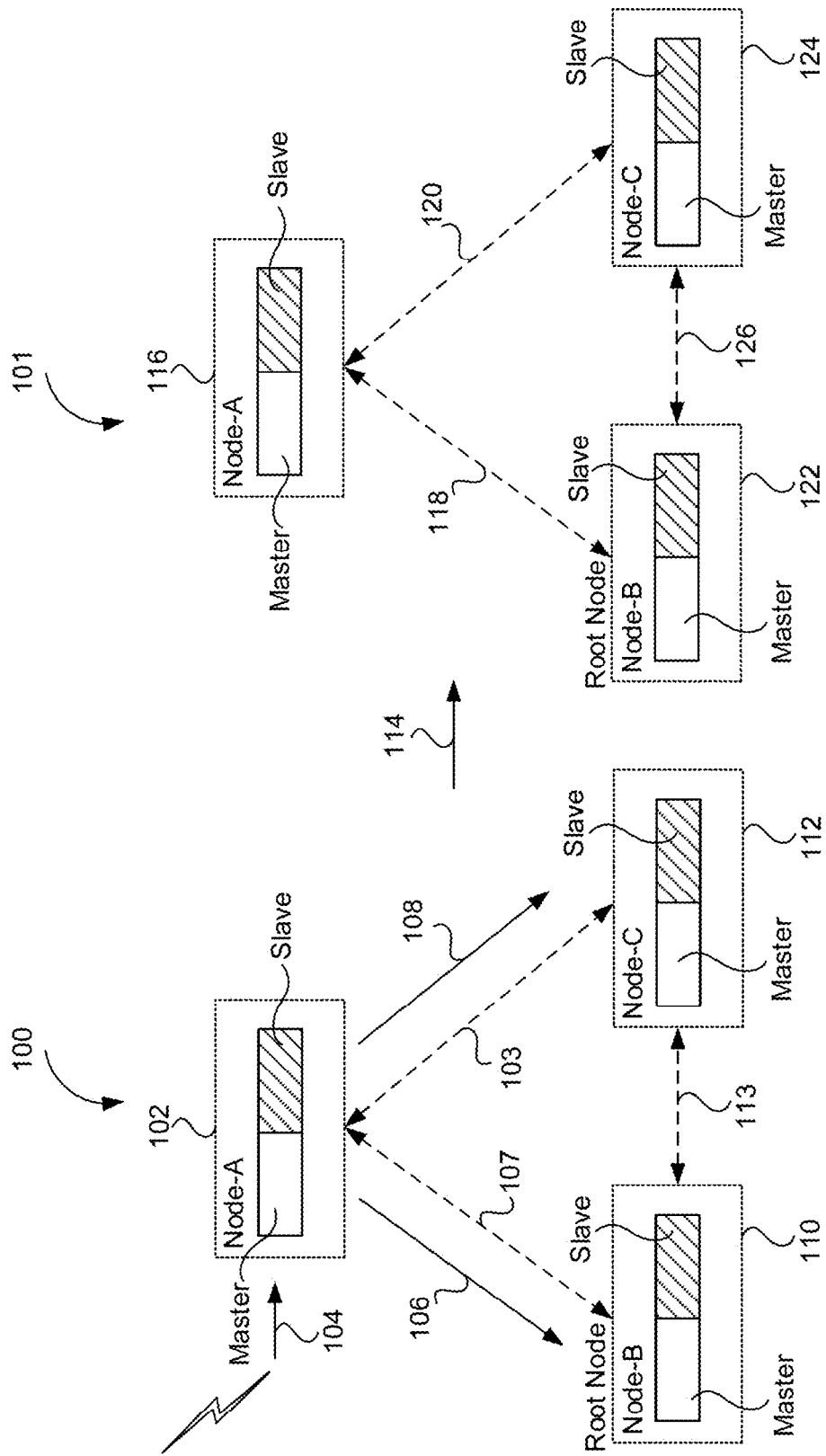
FIG. 1 illustrates how radar-detection and DFS management is carried out in a wireless mesh network. Node-B and Node-C receive radar-detected and CSA messages from Node-A and they switch to an available channel.

In FIG. 1, the elements 100 and 101 denote wireless mesh networks operating in a first channel and a second channel, respectively. The elements 102 and 116 denote Node-A. The elements 110 and 122 denote Node-B. The elements 112 and 124 denote Node-C. The elements 106 and 108 denote signals transmitted over communication paths 107/118, 103/120, and 113/126, such as frequency bands, channels, or other equivalents.

When Note-A 102 detects radar, it sends channel switch announcement (CSA) messages to other nodes, Node-B 110 and Node-C 112, which are not detecting the radar. After receiving the messages from Note-A 102, Node-B 110 and Node-C 112 switch to an available channel. 114. The element 101 shows a wireless mesh network operating in the available channel.

A node selects its modes of operation, master or slave, dynamically. If the node detects radar in a DFS channel, it informs associated stations about a channel to be switched, and it informs its peer nodes about the radar and the channel to be switched by sending a radar-detected message and a CSA message. However, peer nodes may fail to notice those messages, as depicted in FIG. 2.

Figure 2:
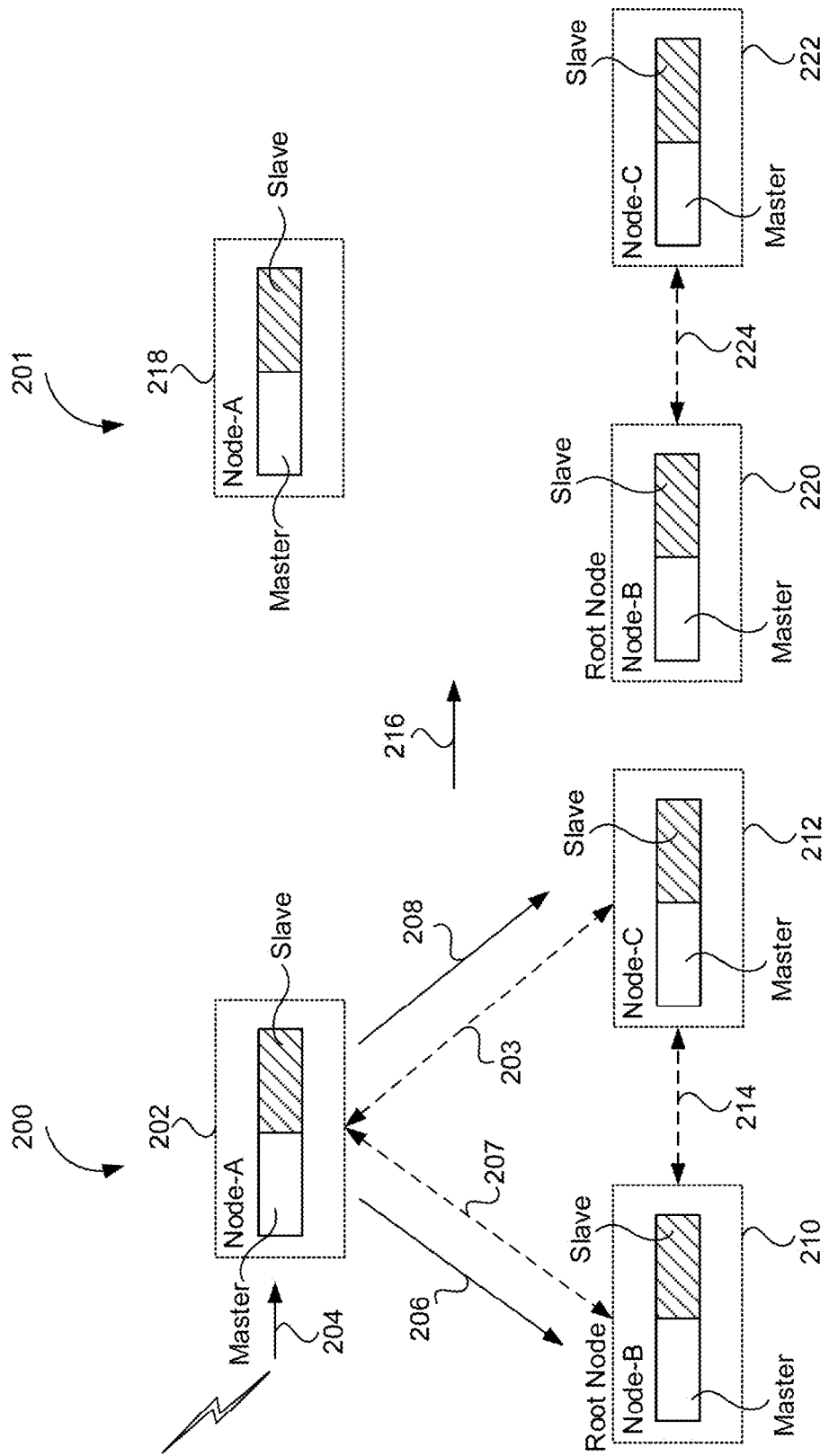
FIG. 2 illustrates how radar-detection and DFS management is carried out in a wireless mesh network. Node-B and Node-C do not receive radar-detected and CSA messages from Node-A and they continue staying in their current channel(s).

In FIG. 2, the elements 200 and 201 denote wireless mesh networks. The elements 202/218, 210/220, 212/222 denote Node-A, Node-B, Node-C, respectively. The elements 206 and 208 denote signals transmitted over communication paths 203, 207, 214, 224, such as frequency bands, channels, or other equivalents.

In FIG. 2, Node-B 210 and Node-C 212 fail to receive Node-A's CSA messages, thus they continue communicating in their current channel(s). As shown in the element 201 of FIG. 2, the wireless mesh network loses it connectivity because Node-A 218 is operating in one channel, while Node-B 220 and Node-C 222 are operating in a different channel.

In such cases, in order to re-establish connection with its peer nodes, a node like Node-A in FIG. 2 switches to slave mode and connects to its peer nodes to inform them about the radar.

Figure 3:
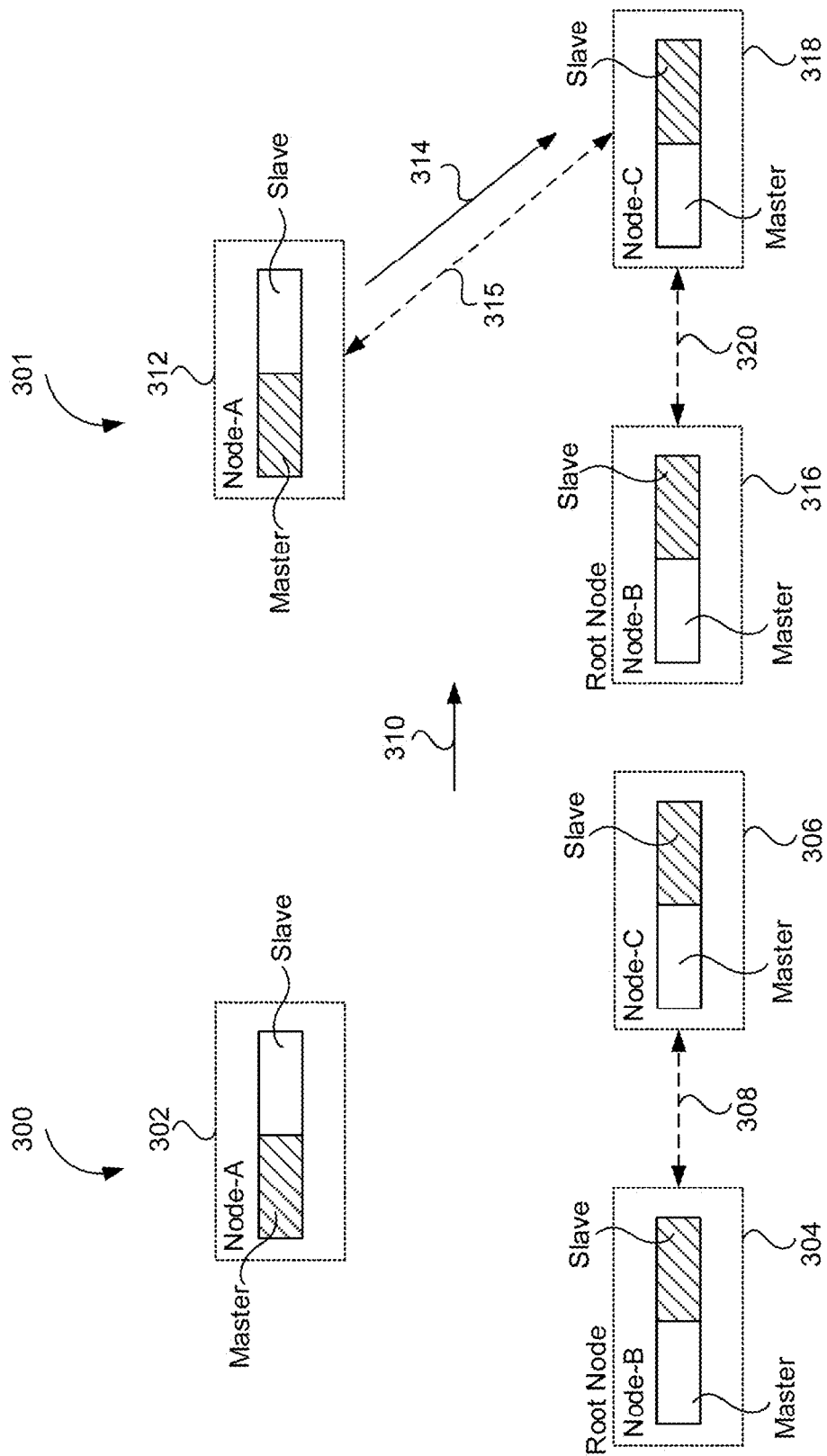
FIG. 3 illustrates how radar-detection and DFS management is carried out in a wireless mesh network. Node-A switches to slave mode and connects to Node-C.

In FIG. 3, the elements 300 and 301 denote wireless mesh networks. The elements 302/312, 304/316, 306/318 denote Node-A, Node-B, Node-C, respectively. The element 314 denotes signal transmitted over a communication path 315, such as frequency bands, channels, or other equivalents. The elements 308/320 are also communication paths.

In FIG. 3, Node-A 302 in the network 300 switches to slave mode and scans other channels to find the root node or a node connected to the root node. Node-C 306 is connected to the root node, Node-B 304. After finding Node-C 306, Node-A 302 connects to Node-C 306 as a slave. 310. Then, Node-A 312 sends radar-detected message in an effort to force Node-C 318 to abandon the radar-detected channel 314. Thus, the rationale behind switching to slave mode is to be able to inform the peer nodes about the detected radar, and force them to abandon the radar-detected channel for at least the duration of non-occupancy period, for example, as defined in the ETSI and FCC DFS regulations.

Figure 4:
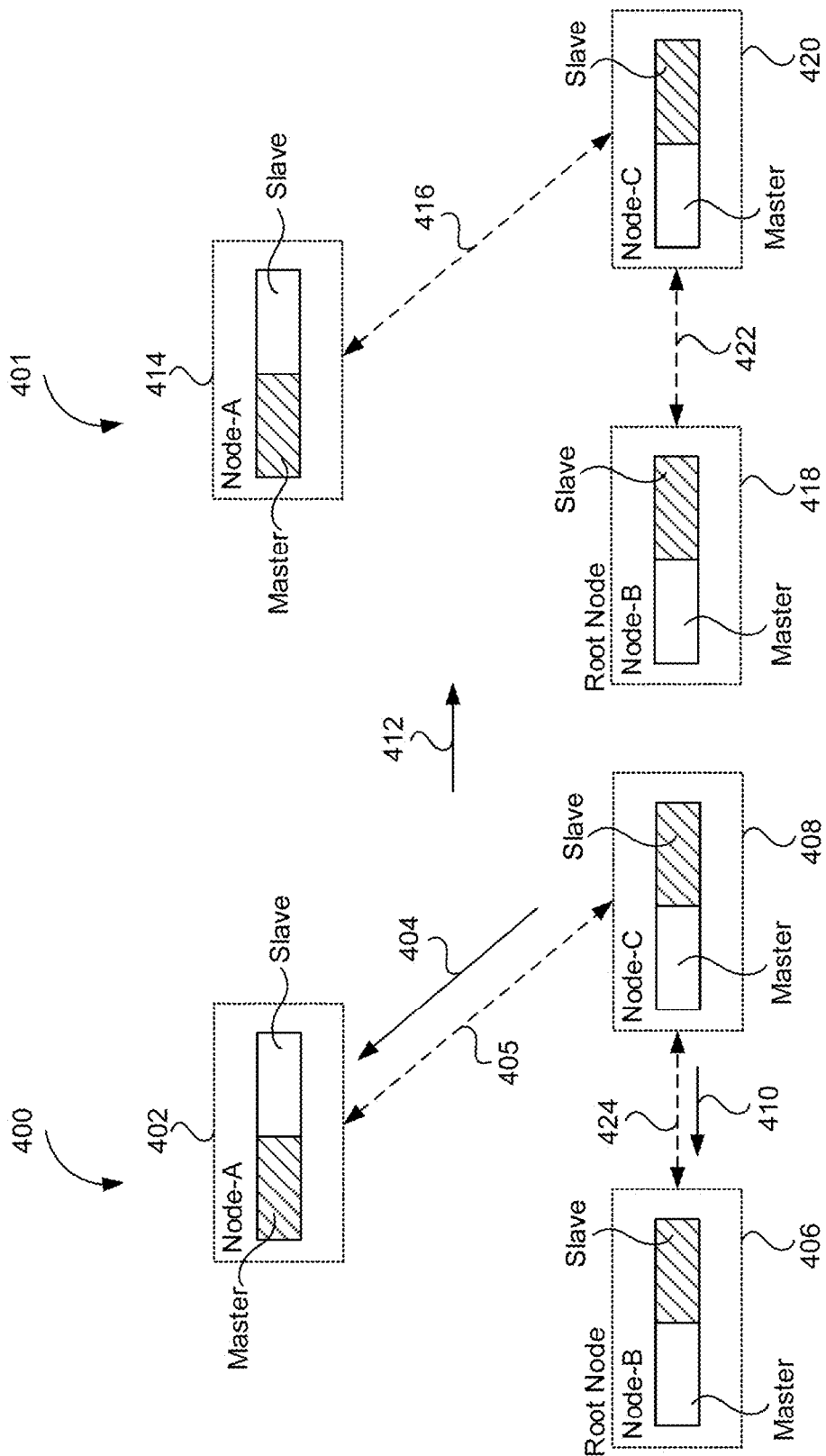
FIG. 4 illustrates how radar-detection and DFS management is carried out in a wireless mesh network. Node-C sends radar-detected and CSA messages to Node-A and Node-B upon receiving radar-detected message from Node-A.

FIG. 4 illustrates how Node-C in FIG. 3 reacts after receiving radar-detected message from Node-A. In FIG. 4, the elements 400 and 401 denote wireless mesh networks. The elements 402/414, 406/418, 408/420 denote Node-A, Node-B, Node-C, respectively. The elements 404, 410 denote signals transmitted over communication paths 405, 422, 424, such as frequency bands, channels, or other equivalents.

Figure 5:
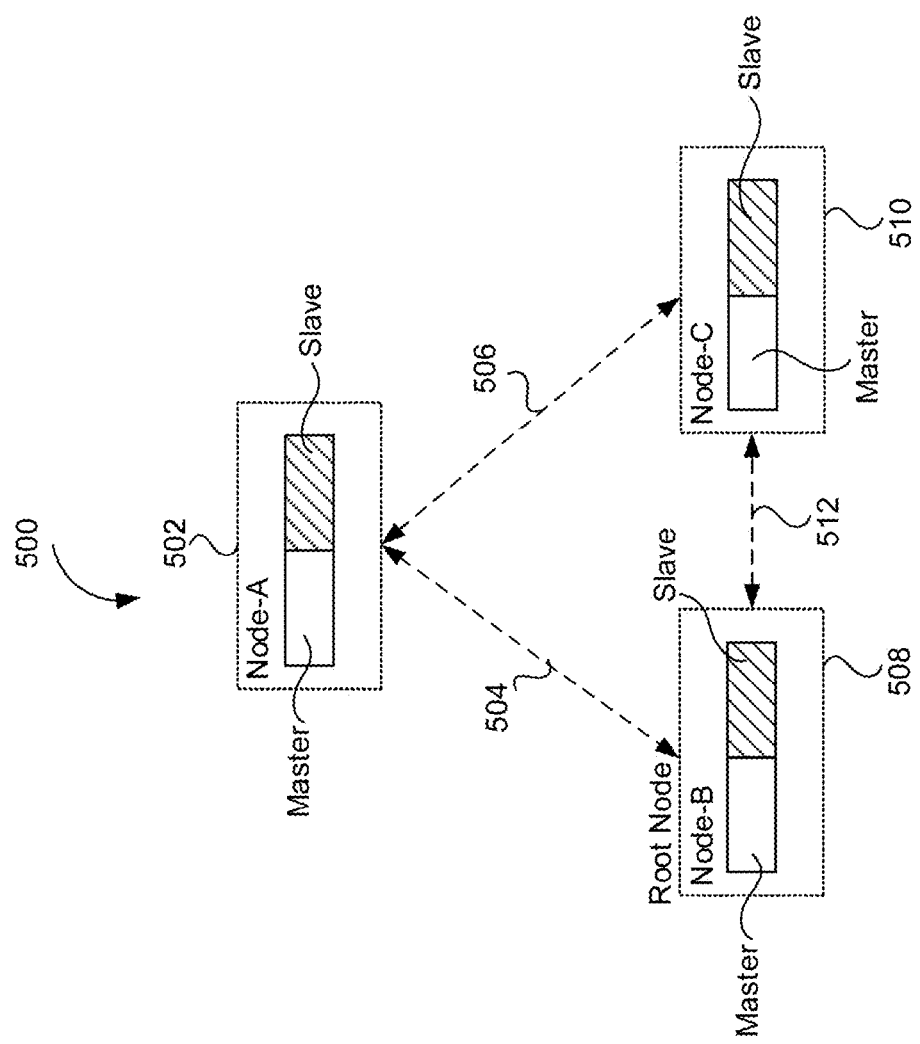
FIG. 5 illustrates how radar-detection and DFS management is carried out in a wireless mesh network. Node-A reverts to master mode and the wireless mesh network is re-established.

In FIG. 4, Node-C 402 triggers transmission of radar-detected and CSA messages to Node-A 402 and Node-B 406. Then, Node-B 406 and Node-C switch to an available channel. 412. Then, Node-A 402, Node-B 406, and Node-C 401 are operating in the same channel. 401. Afterward, as illustrated in FIG. 5, the wireless mesh network 500 is re-established because all the nodes can communicate with each other (504, 506, and 512). Node-A 502 reverts to master mode.

In FIG. 5, the element 500 and 401 denote a wireless mesh network. The elements 502, 508, 510 denote Node-A, Node-B, Node-C, respectively. The elements 504, 506, 512 denote communication paths, such as frequency bands, channels, or other equivalents.

The following example is described here. A wireless mesh network comprises 3 APs (Node-A, Node-B, and Node-C). These three APs operate in a non-DFS channel, and they are scheduled to switch to a DFS channel. Upon switching to the DFS channel, these three APs start Channel Availability Check (CAC). According to the DFS regulations, CAC is required to be carried out to mark a DFS channel as available. If no radars are detected during the CAC, the master device can start transmitting in the channel. No transmissions are allowed during CAC.

The stringent regulations on how to pursue the CAC make the multi-node CAC process complex. First, if some of the APs detect radar during the CAC, but the others do not detect the radar, there is no way, during the CAC procedure for the APs that have detected radar, to inform the other APs about the presence of the radar because no transmissions are allowed during the CAC procedure. In the example scenario, Node-A detects radar during the CAC and switches to an available channel, whereas Node-B and Node-C do not detect the radar and continue to stay in their current channel. In such a case, the network loses its connectivity, since the nodes are now operating in different channels. Second, in another example scenario, Node-A has switched to a predetermined non-DFS channel upon reception of radar. Node-B and Node-C continue operating in the DFS channels since they have not detected the radar in their operating channels. There are two major problems here: first, the network loses its connectivity, and second, some of the nodes continue operating in a channel that is currently used by radar, hence they can probably interfere with the radar.

This disclosure provides methods to overcome these two major problems by dynamically managing the operational mode of the nodes, and by employing control messaging among the nodes to inform one another about the presence of radar and channel switch announcements.

Multiple nodes can set-up a wireless network through various methods. One method is described in U.S. Provisional Patent Application 62/448,718, which is hereby incorporated by reference. In a multi-node network, one of the nodes is regarded as the root-node. In general, the root-node can be any one of the nodes in the multi-node network. At a given time, there is one and only one root-node. The root-node, however, can be changed as needed. A node is assigned to a root-node in the network as required. The root-node always operates in master mode, whereas the other nodes may change their operational modes during run-time as needed. For example, within the context of U.S. Provisional Patent Application 62/448,718, the root-node is the gateway mesh access point (GW MAP).

In a multi-node wireless network, nodes may operate in master mode. Nodes continuously monitor their operating frequencies for possible radars. According to DFS regulations, this is called in-service monitoring. If a node detects radar in its operating channel, it (i) sends a "radar-detected message" to its peer-nodes, (ii) sends Channel Switch Announcement (CSA) or Extended CSA (ECSA) message to its peer-nodes and its stations, (iii) buffers all ongoing traffic and ceases all transmissions in the radar-detected channel, (iv) marks the channel as unavailable for a duration of non-occupancy period (as defined in the DFS regulations), (v) changes its operational mode to slave, and (vi) switches to the available channel it has announced in its CSA or ECSA (Extended CSA) message. This channel can be a non-DFS channel or a DFS channel which had been found to be radar-free via Channel Availability Check (CAC) or off-channel CAC. If the node can reestablish connection with the root-node in the switched channel, then the node reverts to master mode, and continues its normal operation. However, if the node cannot reestablish connection with the root-node, then the node starts scanning other channels to find the root-node, or a node (in master mode) that is connected to the root-node through single hop or multiple hops.

In the channel scan, the node (in slave mode) does not pursue active scan (by sending probe request messages) in a DFS channel, unless it has received an enabling signal from a master device. This master node does not need to be the root-node; it can be any master node in the vicinity. For example, beacons sent by an AP (in master mode) can be regarded as enabling signals for the slave device. The node (in slave mode) pursues passive scanning in DFS channels, if it does not receive enabling signals from master devices. In passive scanning, a node does not make any transmissions; it just listens to the messages sent by other devices.

If the node finds the root-node, or a node (in master mode) that is connected to the root-node, it establishes connection with the found node in slave mode. The node informs the root-node about the detected radar, and forces it to switch to an available channel, so that the radar-detected channel is abandoned.

The current operating channel can be marked as unavailable by the node in slave mode. This may occur in various scenarios. For example, a node may have detected radar and switched to a non-DFS channel. But, its peer-nodes including the root-node may have not heard the radar-detected message or the CSA (or ECSA) message. In such cases, the node marks the channel as unavailable for the duration defined in the standard. For example, ETSI standards like EN 301 893 V2.1.1 (2017-05) specify about 30 min. non-occupancy period. If the node reestablishes connection with its root-node in a channel that is marked as unavailable by itself, it does not revert to master node, since it is against regulations. Instead, the node (in slave mode) sends "radar-detected message" to its root-node, so that the root node can mark this channel as unavailable as well. Once the root-node receives the radar-detected message, it sends radar-detected message to its peer nodes, and CSA (or ECSA) to its peer nodes and station nodes, causing the nodes connected to it to switch to an available channel.

After the nodes received the CSA (or ECSA) message and switched to the same channel with the root-node, it establishes connections with the root-node in slave mode, and reverts to master node, right after the connection.

The method described above forces the entire network to operate in a totally radar-free channel. That is, even if one of the nodes in the network detects radar, all nodes are made to mark that channel as unavailable.

An example of a network comprises an AP and a UR, and multiple clients that are connected to either the AP or the UR. The user has set the operating channel of the AP to a DFS channel manually. The UR is connected to the AP via AP's operating channel. If the UR detects radar, but the AP does not detect radar, then the UR does not inform the AP about its radar-detection. Hence, the AP-UR network continues to operate in the presence of radar, although they are likely to obfuscate radar signal. However, if the AP detects radar it can make the UR change its channel, by CSA messages. Moreover, once the AP changes its channel due to radar-detection, the UR can follow its AP.

However, if the proposed method is employed, then the UR would be able to force the root-node to abandon the radar-detected channel, and make the root node switch to an available, non-radar channel.

FIGS. 6-9 illustrate how radar-detection and DFS management is carried out in a wireless repeater network.

Figure 6:
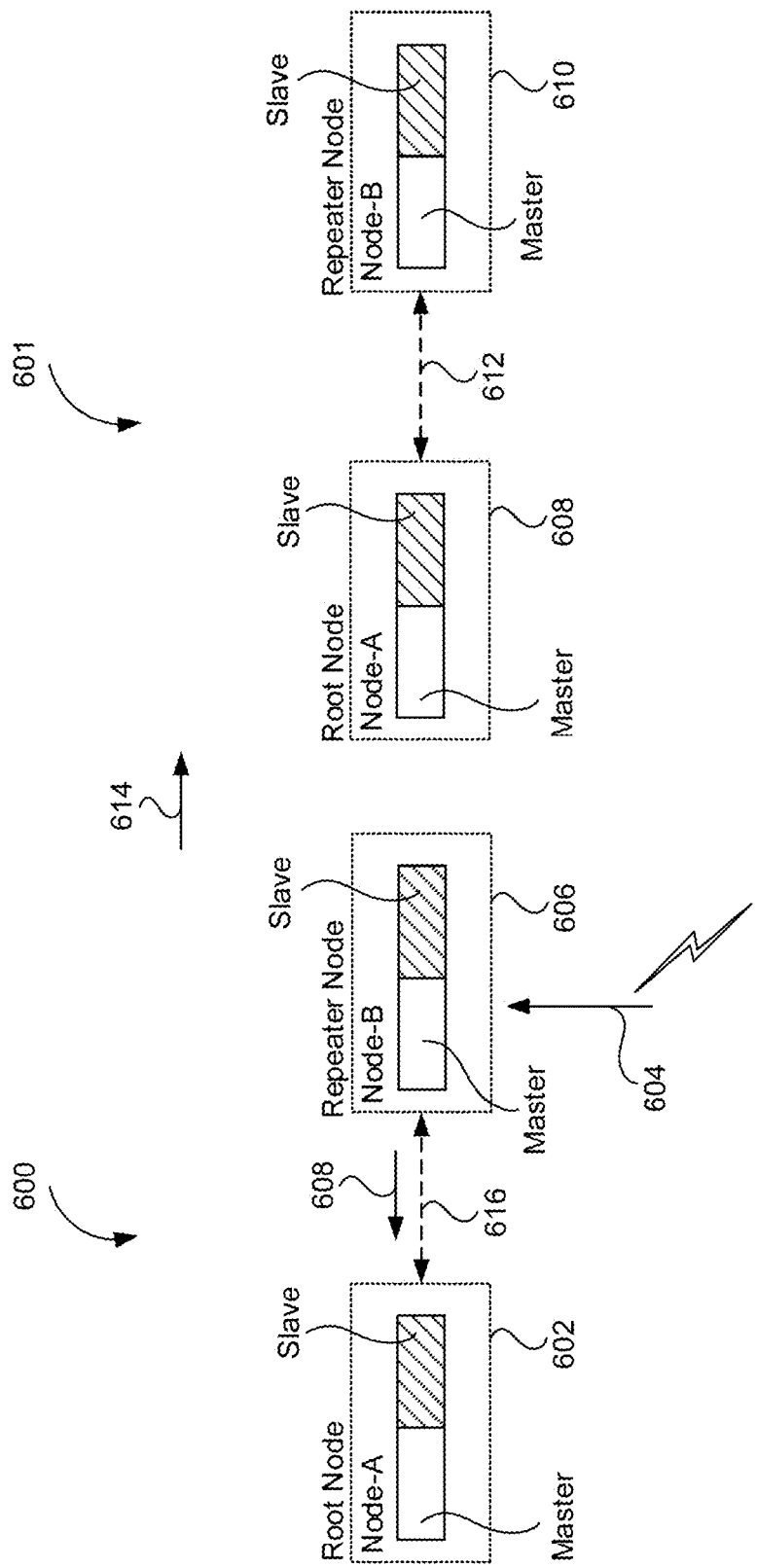
FIG. 6 illustrates how radar-detection and DFS management is carried out in a wireless repeater network. Node-A receives radar detected and CSA messages from Node-B and then switches to an available channel.
Figure 7:
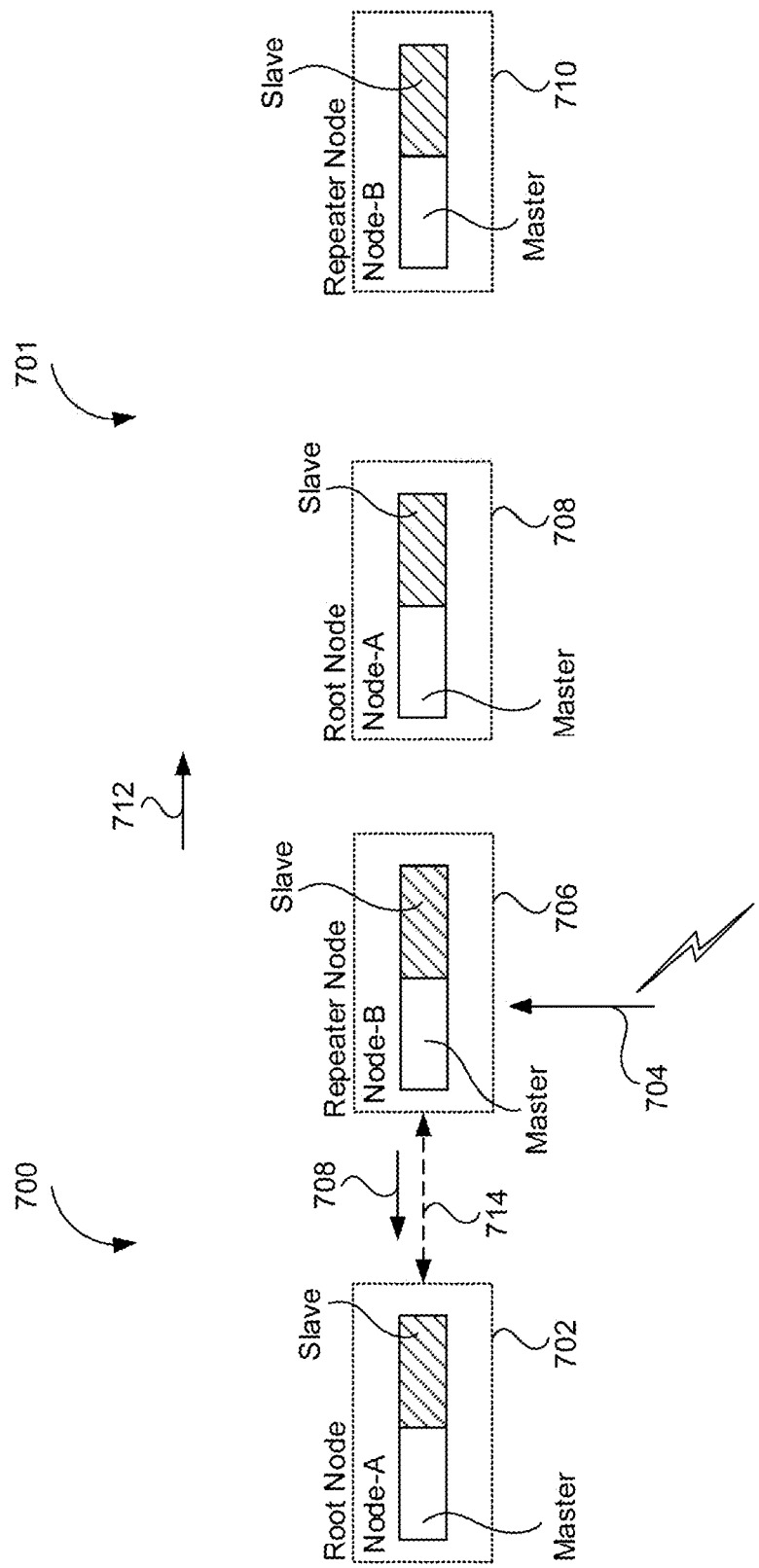
FIG. 7 illustrates how radar-detection and DFS management is carried out in a wireless repeater network. Node-A does not receive radar detected and CSA messages from Node-B and continues to stay in its current channel.
Figure 8:
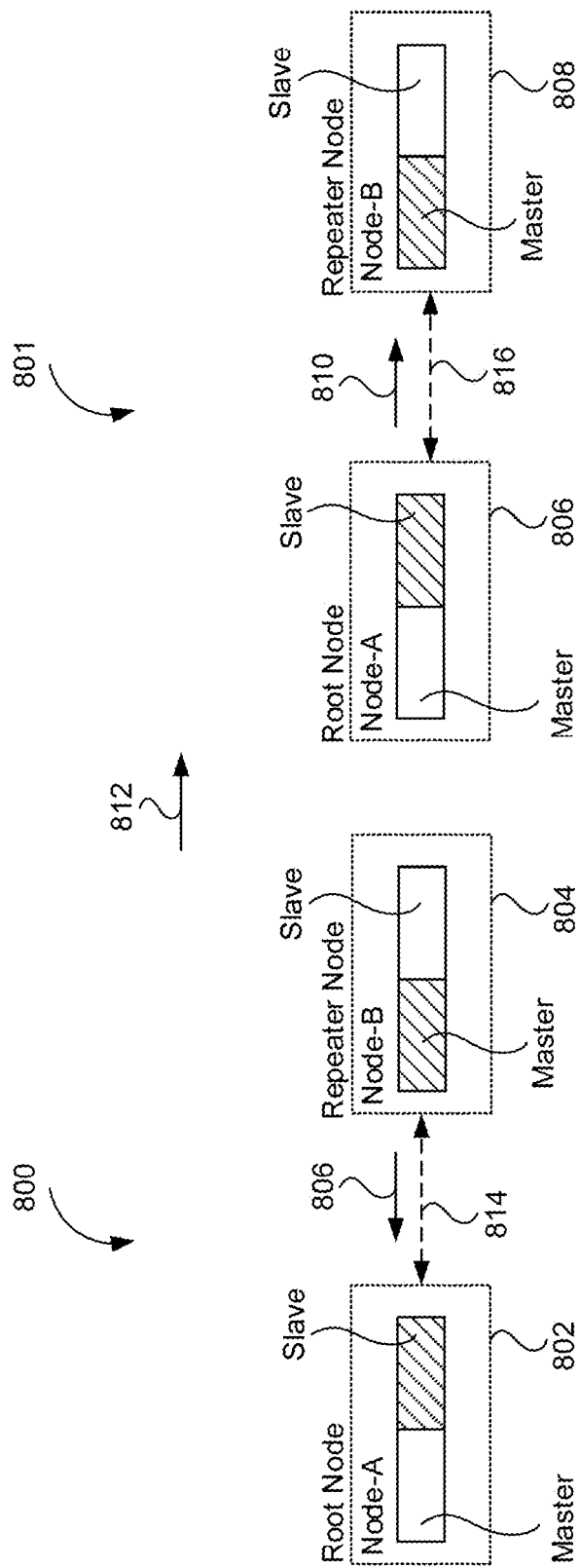
FIG. 8 illustrates how radar-detection and DFS management is carried out in a wireless repeater network. Node-A sends radar-triggered and CSA messages to Node-B upon receiving radar-detected message from Node-B.
Figure 9:
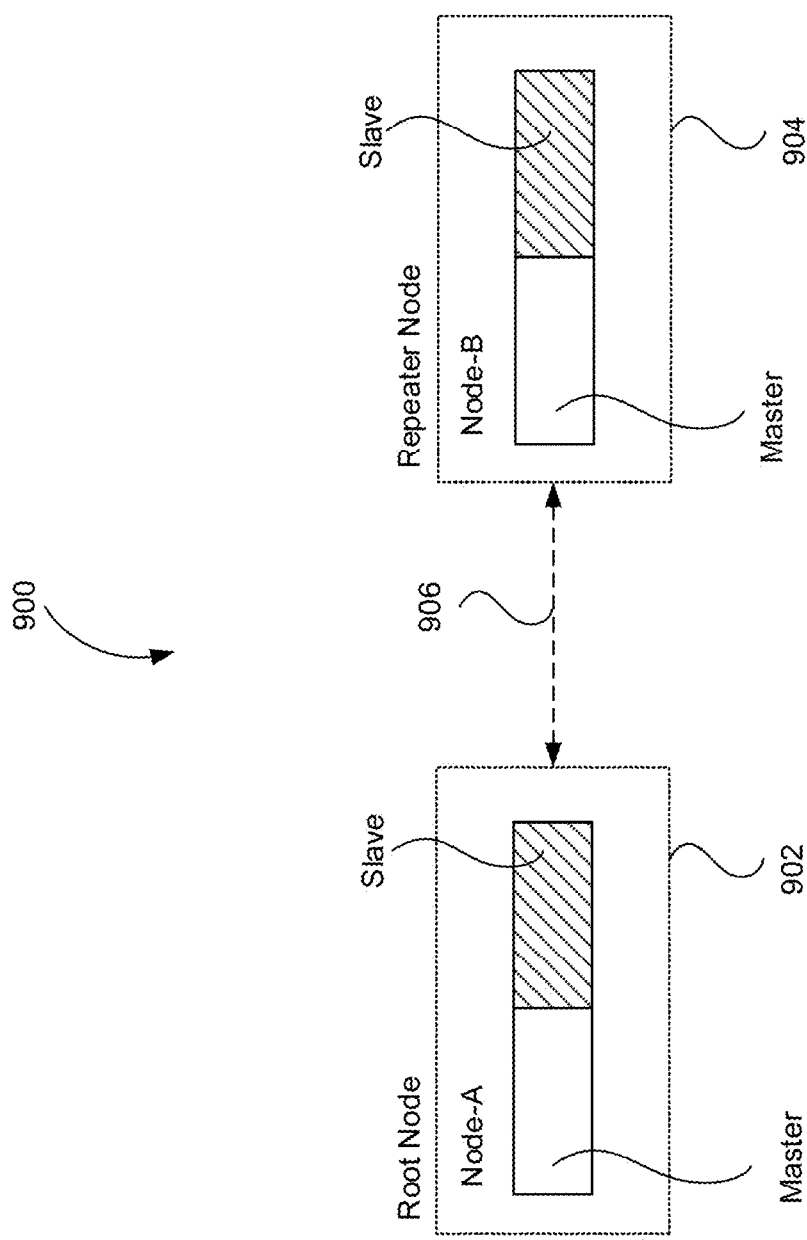
FIG. 9 illustrates how radar-detection and DFS management is carried out in a wireless repeater network. Node-B reverts to master mode and the wireless repeater network is re-established.

In FIG. 6, the elements 600 and 601 denote wireless repeater networks. The elements 602/608, 606/610 denote Node-A and Node-B, respectively. The element 608 denotes a signal transmitted over a communication path 616, such as frequency bands, channels, or other equivalents. The element 612 is also a communication path. In FIG. 7, the elements 700 and 701 denote wireless repeater networks. The elements 702/708, 706/710 denote Node-A and Node-B, respectively. The element 708 denotes a signal transmitted over a communication path 714. In FIG. 8, the elements 800 and 801 denote wireless repeater networks. The elements 802/806, 804/808 denote Node-A and Node-B, respectively. The elements 806 and 810 denote signals transmitted over communication paths 814, 816, respectively. In FIG. 9, the element 900 denotes a wireless repeater network. The elements 902, 904 denote Node-A and Node-B, respectively. The element 906 denotes a communication path.

In FIG. 6, when Node-B 606, which is a UR, detects radar 604, it sends radar-detected and CSA messages to Node-A 606, which does not detect radar. 608. Then, Node-A switches to an available channel. 614. Then, Node-A 608 and Node-B 610 are operating in the same channel in the wireless repeater network 601.

FIG. 7 illustrates a wireless repeater network comprising Node-B 706 that detects radar 704 and Node-A 702 that does not detect radar. When Node-A 702 does not receive radar-detected and CSA messages 708 sent by Node-B 706, it continues to stay in its current channel, which is different from the channel that Node-B 706 is operating in. Accordingly, as shown in the element 701, Node-A 708 and Node-B 710 do not communicate each other. That is, the wireless repeater network 701 loses its connectivity.

In FIG. 8, Node-B 804 switches to slave mode and scans for the root-node (Node-A) 802. When it finds the root node 802, it connects to the root node 802 in slave mode. Then, Node-B 804 sends Node-A 802 radar-detected message in an effort to force Node-A 802 to abandon the radar-detected channel. Upon receiving radar-detected message from Node-B 804, Node-A 802 triggers transmission of radar-detected and CSA messages 810. Then, Node-B 808 switches to an available channel designated in the CSA message. FIG. 9 further illustrates that Node-B 904 reverts to master mode, and the wireless repeater network 900 is re-established in the available channel 906.

Figure 10:
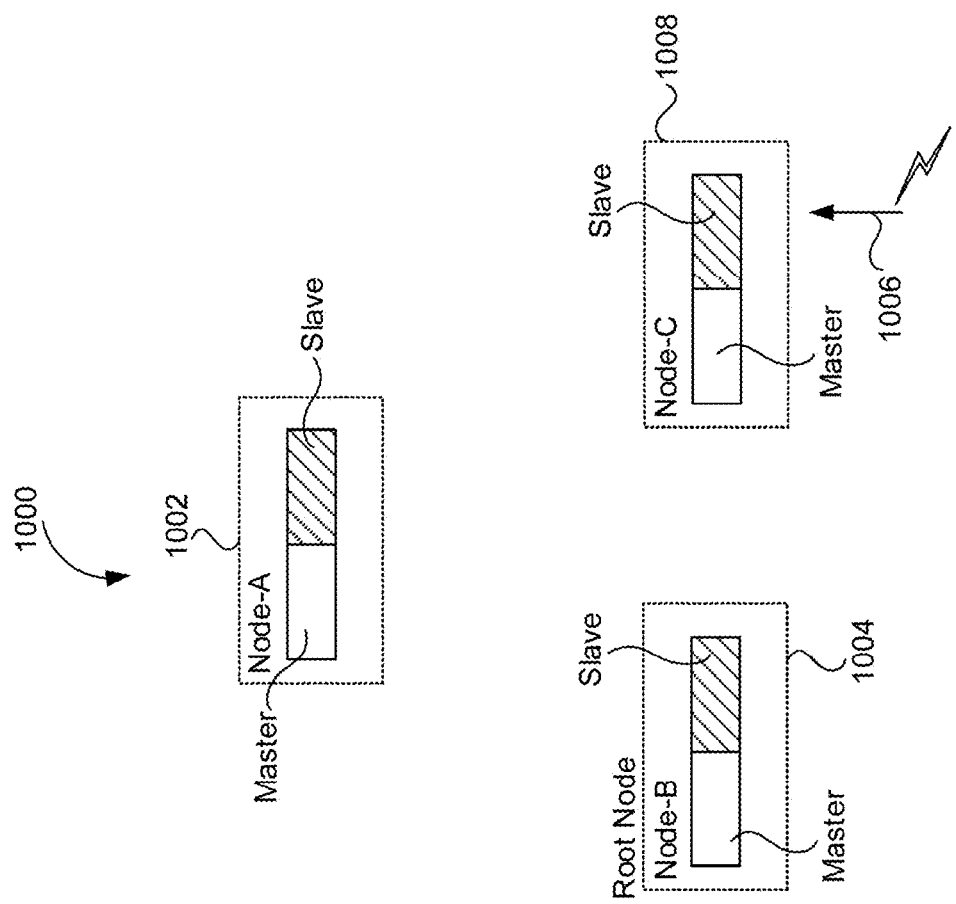
FIG. 10 illustrates how the network is recovered and re-established in case of asymmetric radar detection during Channel Availability Check (CAC). No wireless connections are established among Node-A, Node-B, and Node-C.
Figure 11:
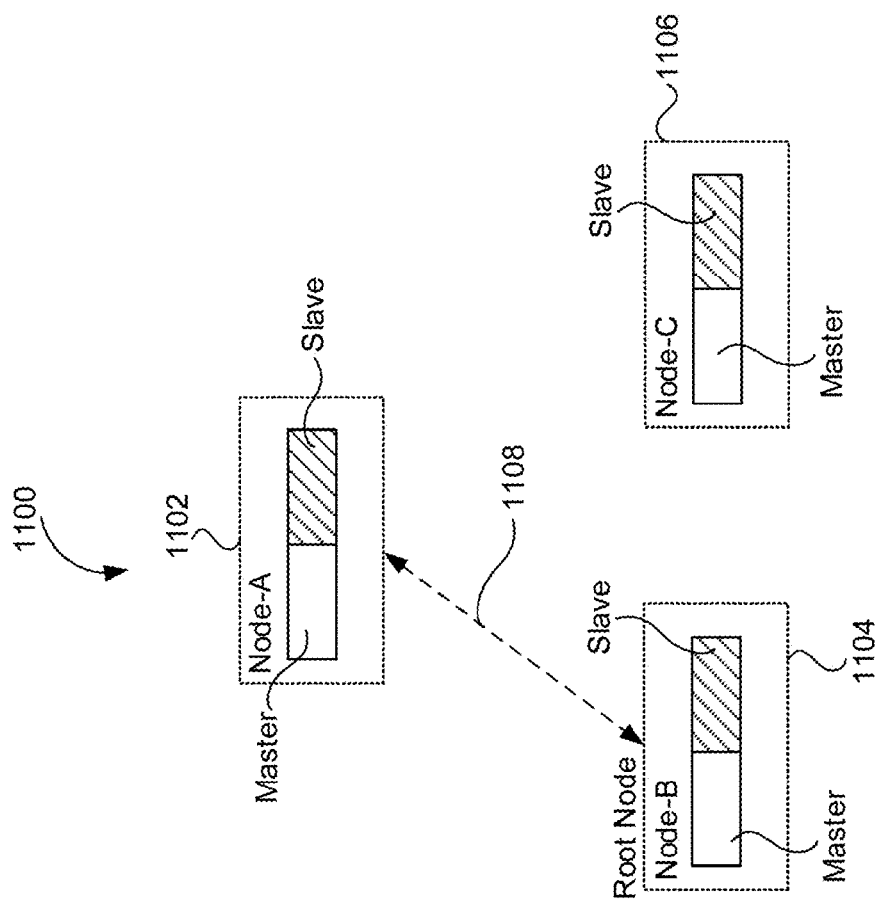
FIG. 11 illustrates how the network is recovered and re-established in case of asymmetric radar detection during CAC. Only the connection between Node-A and Node-B is established.
Figure 12:
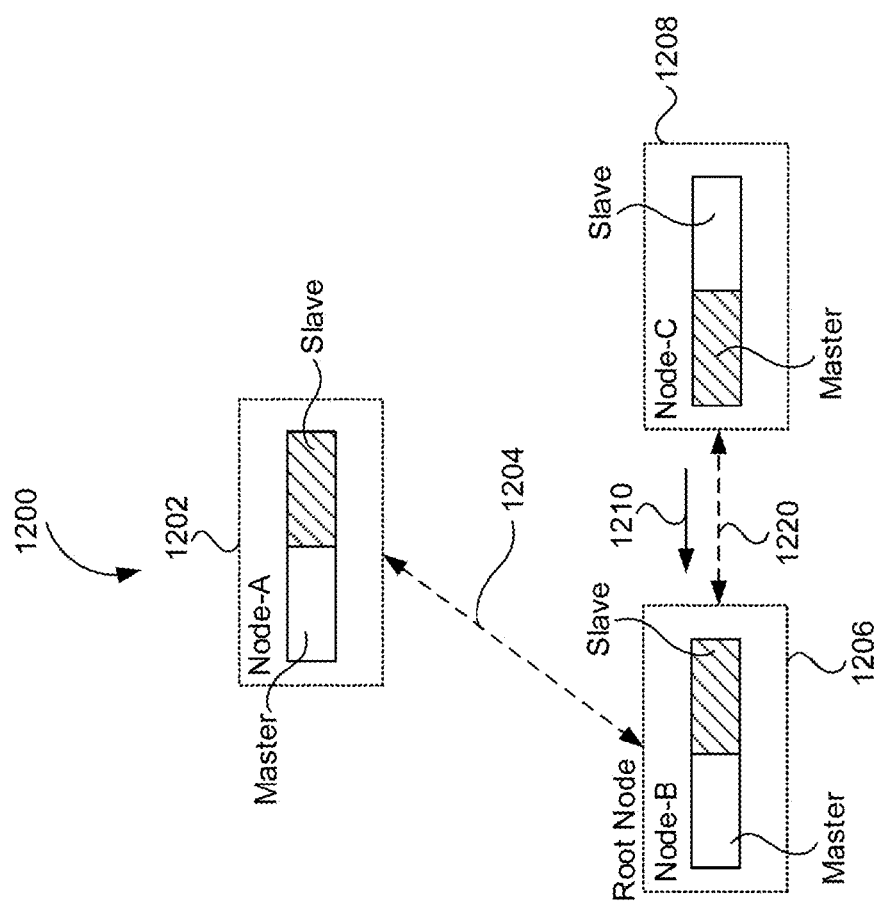
FIG. 12 illustrates how the network is recovered and re-established in case of asymmetric radar detection during CAC. Having lost connection with Node-B, Node-C switches to slave mode.
Figure 13:
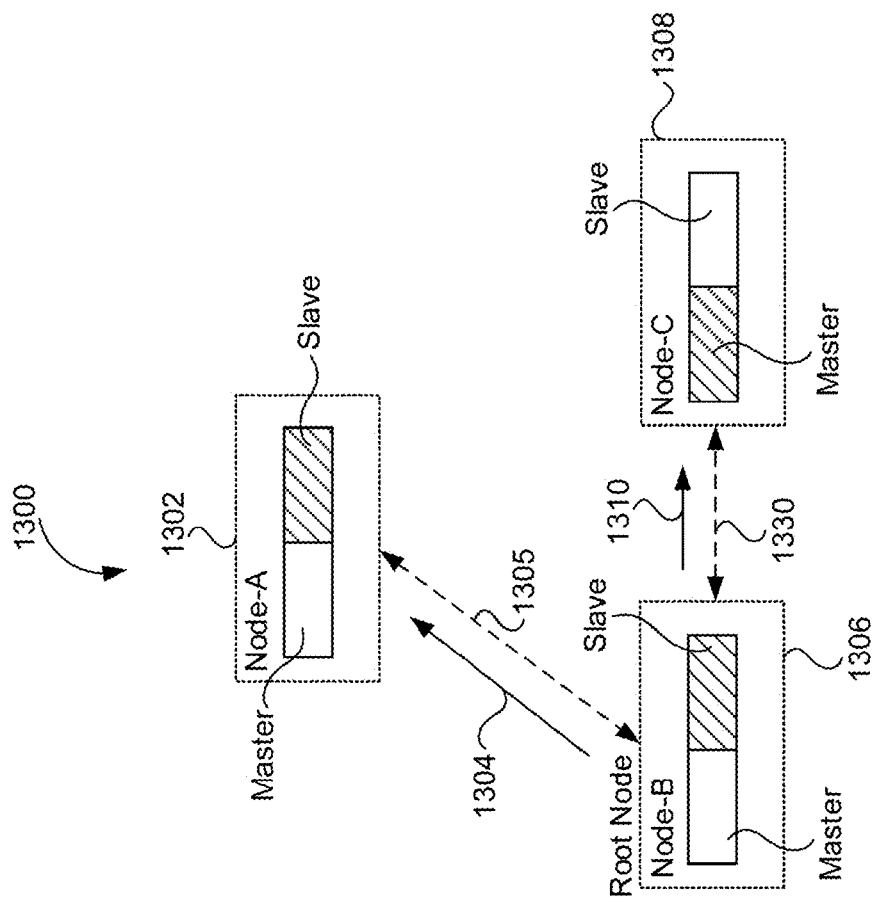
FIG. 13 illustrates how the network is recovered and re-established in case of asymmetric radar detection during CAC. Node-B sends radar-triggered and CSA messages to Node-A and Node-C upon receiving radar-detected message from Node-C.
Figure 14:
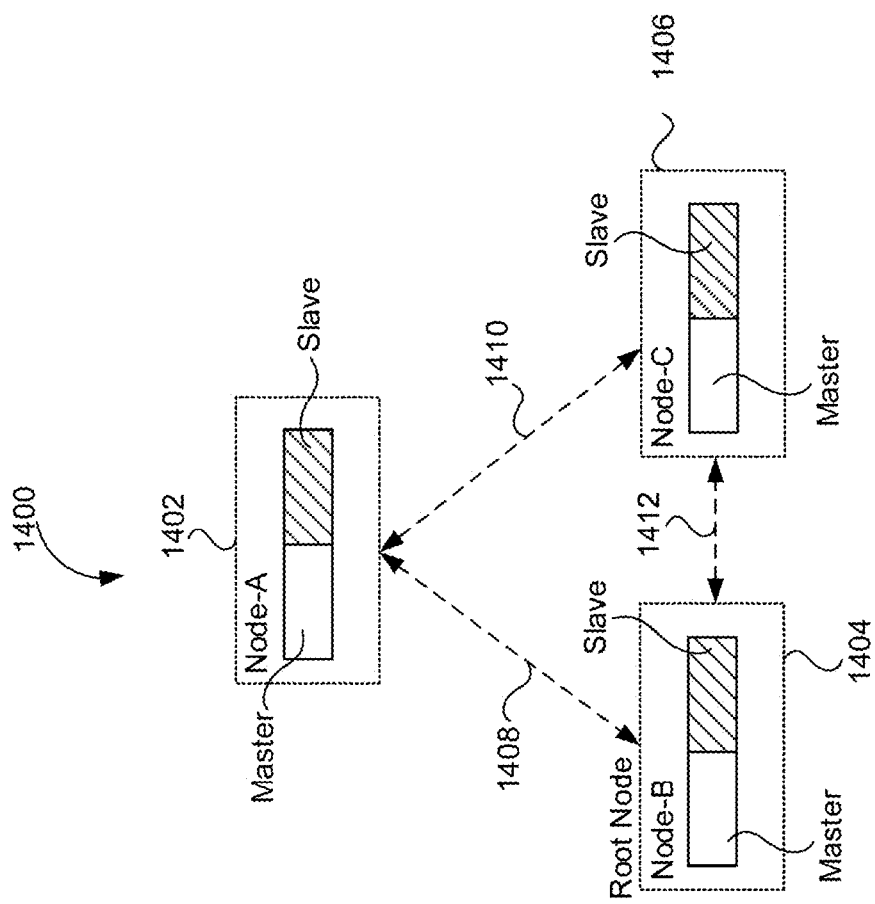
FIG. 14 illustrates how the network is recovered and re-established in case of asymmetric radar detection during CAC. The network's connectivity is re-established.

FIGS. 10-14 illustrate how the network is recovered and re-established in case of asymmetric radar detection during CAC. In FIG. 10, the element 1000 denotes a wireless network. The elements 1004, 1008 denote Node-A and Node-B, respectively. The element 1006 denotes detecting radar. In FIG. 11, the element 1100 denotes a wireless network. The elements 1104, 1106 denote Node-A and Node-B, respectively. The element 1108 denotes a communication path. In FIG. 12, the element 1200 denotes a wireless network. The elements 1202, 1206, and 1208 denote Node-A, Node-B, and Node-C, respectively. The elements 1204 and 1220 denote communication paths and the element 1210 denotes a signal. In FIG. 13, the element 1300 denotes a wireless network. The elements 1302, 1306, and 1308 denote Node-A, Node-B, and Node-C, respectively. The elements 1305 and 1330 denote communication paths and the elements 1304, 1310 denote signals. In FIG. 14, the element 1400 denotes a wireless network. The elements 1402, 1404, and 1406 denote Node-A, Node-B, and Node-C, respectively. The elements 1408, 1410, and 1412 denote communication paths, such as frequency bands, channel, or other equivalents.

FIG. 10 illustrates that the wireless network 1000 does not have any connection among its nodes 102, 1004, and 1006. Upon detection of radar, Node-C 1006 switches to an available channel, while Node-A 1002 and Node-B 1004 are carrying out CAC in another channel.

In FIG. 11, even after CAC is completed, the wireless network 1100 does have the complete connectivity among its nodes 1102, 1104, and 1106. Node-A 1102 and Node-B 1104 are operating in the same channel, thus they are connected. 1108. However, Node-C 1106 is operating in a different channel.

In FIG. 12, Node-C 1208 switches to slave mode after having lost connection with any root node. Node-C 1208 scans for a root node. After finding the root-node, Node-B 1206, Node-C 1208 sends radar-detected message 1210 in an effort to force Node-B 1206 to abandon the radar-detected channel. As shown in FIG. 13, after receiving the radar-detected message from Node-C (1208 in FIG. 12, 1308 in FIG. 3), Node-B 1306 triggers transmission of radar-detected and CSA messages 1304 to Node-C 1308 and Node-A 1302. As illustrated in FIG. 14, after receiving CSA and/or radar-detected messages, all nodes 1402, 1404, and 1406 switch to the same, available channel designated in the CSA, thus the wireless network 1300 re-establishes its connections 1408, 1410, and 1412.

Figure 15:
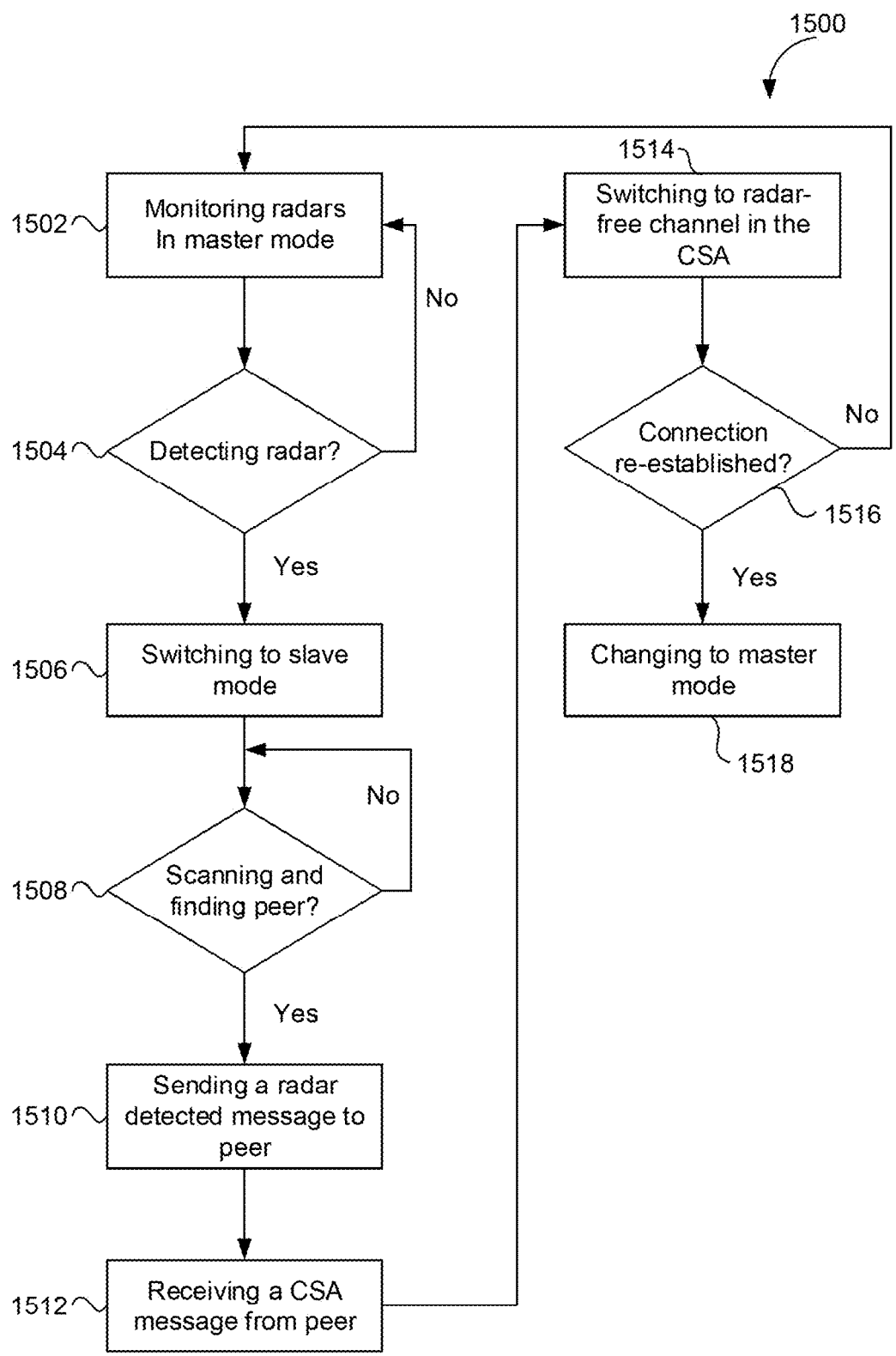
FIG. 15 illustrates a flow chart of an exemplary process for a wireless device according to one or more disclosures.

FIG. 15 shows a flow chart 1500 of an exemplary process where the wireless device performs according to aspects of the disclosure. Initially, the wireless device is monitoring radars while it is operating in master mode 1502. If it detects radar within its operating frequency channel 1504 and it is not a root node, it may switch to slave mode 1506. Otherwise, it will continue to monitor any radar 1502. After switching to slave mode 1506, the wireless device scans frequency channels and tries to find any peer device, which is preferably a root node or a node connecting to the root node 1508. After finding the peer device and establishing a connection with the peer device, the wireless device sends a radar-detected message to the peer device 1510. Then, the peer device sends a channel-switch announcement (CSA) message to the wireless device 1512. After receiving the CSA message from the peer device, the wireless device gets to know which channel is radar-free. Accordingly, the wireless device switches the radar-free channel noticed by the peer device 1514. Because the wireless device and the peer device are operating in the same frequency channel after the switching, the communication connection between the two devices may be reestablished 1516. Otherwise, the wireless device has to monitor radar again 1502. After the connection is successfully reestablished, the wireless device may switch back to master mode 1518.

If the nodes in the multi-node network have connections other than their wireless links, which may be on DFS channels, then nodes can utilize those connections for transmission of radar-detected messages and CSA (or ECSA) messages. For example, if two nodes are connected via Ethernet, then a node that detects radar in a certain channel, can inform the other node about the detected radar via the Ethernet link. Thus, if the other node resides in the same channel, it can abandon the radar-detected channel. This is especially important while these nodes are carrying out CAC at the same time. Because these nodes cannot communicate among each other during CAC, due to regulations, when one node detects radar, it can send a CSA message and radar-detected messages over the Ethernet link; thus alerting the other nodes about the presence of radar, and forcing them to switch to an available channel before CAC is completed, and re-establishing the network in the radar-free available channel.

What is claimed is:

1. A method implemented by a first wireless device, the method comprising:
    switching from operating in a dynamic frequency selection (DFS) master mode to operating in a DFS slave mode upon detecting radar in a first frequency channel, wherein the DFS master mode enables DFS functionality of Radar Interference Detection and transmission control of any wireless device operating in a DFS slave mode, wherein the DFS slave mode disables DFS functionality of Radar Interference Detection;
    sending a radar-detected message to a second wireless device over a non-wireless link, wherein the radar-detected message indicates that radar has been detected in the first frequency channel, wherein the non-wireless link is a wired connection;
    switching the first wireless device from the first frequency channel to a second frequency channel; and
    connecting to the second wireless device in the second frequency channel.

2. The method of claim 1, wherein the first wireless device and the second wireless device are performing channel availability check when the radar-detected message is sent to the second wireless device.

3. The method of claim 1, wherein the radar-detected message sent to the second wireless device prompts the second wireless device to switch to the second frequency channel.

4. The method of claim 1, wherein the first frequency channel is a DFS channel.

5. The method of claim 1, wherein the radar-detected message sent to the second wireless device prompts the second wireless device to switch from operating in the DFS master mode to operating in the DFS slave mode.

6. A first wireless device, the first wireless device comprising:
    a processor; and
    a transceiver, wherein the processor and the transceiver are configured to:
    switch from operating in a dynamic frequency selection (DFS) master mode to operating in a DFS slave mode upon detecting radar in a first frequency channel, wherein the DFS master mode enables DFS functionality of Radar Interference Detection and transmission control of any wireless device operating in a DFS slave mode, wherein the DFS slave mode disables DFS functionality of Radar Interference Detection;
    send a radar-detected message to a second wireless device over a non-wireless link, wherein the radar-detected message indicates that radar has been detected in the first frequency channel, wherein the non-wireless link is a wired connection;
    switch the first wireless device from the first frequency channel to a second frequency channel; and
    connect to the second wireless device in the second frequency channel.

7. The first wireless device of claim 6, wherein the first wireless device and the second wireless device are performing channel availability check when the radar-detected message is sent to the second wireless device.

8. The first wireless device of claim 6, wherein the radar-detected message sent to the second wireless device prompts the second wireless device to switch to the second frequency channel.

9. The first wireless device of claim 6, wherein the first frequency channel is a DFS channel.

10. The first wireless device of claim 6, wherein the radar-detected message sent to the second wireless device prompts the second wireless device to switch from operating in the DFS master mode to operating in the DFS slave mode.

11. A system, the system comprising:
    a first wireless device and a second wireless device, wherein the first wireless device is configured to:
    switch from operating in a dynamic frequency selection (DFS) master mode to operating in a DFS slave mode upon detecting radar in a first frequency channel, wherein the DFS master mode enables DFS functionality of Radar Interference Detection and transmission control of any wireless device operating in a DFS slave mode, wherein the DFS slave mode disables DFS functionality of Radar Interference Detection;
    send a radar-detected message to the second wireless device over a non-wireless link, wherein the radar-detected message indicates that radar has been detected in the first frequency channel, wherein the non-wireless link is a wired connection;
    switch the first wireless device from the first frequency channel to a second frequency channel; and
    connect to the second wireless device in the second frequency channel.

\* \* \* \* \*